(12) United States Patent
Wilenski et al.

(10) Patent No.: US 9,851,182 B2
(45) Date of Patent: Dec. 26, 2017

(54) MACRO FIBER FOR COMPOSITE ARTICLES

(71) Applicant: The Boeing Company, Chicago, IL (US)

(72) Inventors: Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 14/805,231

(22) Filed: Jul. 21, 2015

(65) Prior Publication Data

US 2016/0033237 A1 Feb. 4, 2016

Related U.S. Application Data

(62) Division of application No. 13/523,108, filed on Jun. 14, 2012, now Pat. No. 9,114,589.

(51) Int. Cl.
| | |
|---|---|
| *F41H 5/04* | (2006.01) |
| *B32B 5/08* | (2006.01) |
| *B32B 5/12* | (2006.01) |
| *D01F 6/00* | (2006.01) |

(52) U.S. Cl.
CPC ............ *F41H 5/0407* (2013.01); *B32B 5/08* (2013.01); *B32B 5/12* (2013.01); *D01F 6/00* (2013.01); *F41H 5/0485* (2013.01); *B32B 2262/10* (2013.01); *B32B 2262/101* (2013.01); *B32B 2307/40* (2013.01); *B32B 2307/412* (2013.01); *B32B 2307/418* (2013.01); *B32B 2307/536* (2013.01); *B32B 2307/558* (2013.01); *B32B 2307/712* (2013.01); *B32B 2571/02* (2013.01); *B32B 2605/18* (2013.01); *Y10T 428/24* (2015.01); *Y10T 428/24124* (2015.01); *Y10T 428/26* (2015.01); *Y10T 428/268* (2015.01); *Y10T 428/2929* (2015.01)

(58) Field of Classification Search
CPC ....................................................... G04B 39/00
USPC .......................................................... 428/113
See application file for complete search history.

(56) References Cited

U.S. PATENT DOCUMENTS

| | | | |
|---|---|---|---|
| 5,665,450 A * | 9/1997 | Day | B29C 70/086 |
| | | | 156/178 |
| 7,267,872 B2 | 9/2007 | Lee | |
| 2005/0227564 A1 | 10/2005 | Bond | |

(Continued)

FOREIGN PATENT DOCUMENTS

| | | |
|---|---|---|
| CN | 1433443 A | 7/2003 |
| CN | 101186109 A | 5/2005 |

(Continued)

OTHER PUBLICATIONS

Hills, Inc., "An Introduction to Bicomponent Fibers," retrieved Apr. 12, 2012.

(Continued)

*Primary Examiner* — Brent T O'Hern

(57) ABSTRACT

A macro fiber for a composite article may include a plurality of inner fibers. Each one of the inner fibers may have an inner fiber final cross-sectional size of less than approximately 100 nanometers. The inner fibers may be surrounded by matrix material.

21 Claims, 11 Drawing Sheets

(56) References Cited

U.S. PATENT DOCUMENTS

| | | | |
|---|---|---|---|
| 2006/0024483 A1* | 2/2006 | Koch | B64C 1/1484 |
| | | | 428/292.1 |
| 2006/0182941 A1 | 8/2006 | Yano | |
| 2008/0241537 A1 | 10/2008 | Sennett et al. | |
| 2012/0008806 A1 | 1/2012 | Hess | |
| 2012/0088063 A1 | 4/2012 | Kozar et al. | |

FOREIGN PATENT DOCUMENTS

| | | | | |
|---|---|---|---|---|
| CN | 101186109 A * | 5/2008 | | |
| DE | 19758009 | 7/1998 | | |
| DE | 10064396 | 7/2002 | | |
| DE | 102008056702 | 5/2010 | | |
| GB | 2342362 | 12/2000 | | |
| JP | 2010023508 A * | 2/2010 | | B29C 70/30 |
| JP | 2010180416 | 8/2010 | | |
| WO | WO0192381 | 12/2001 | | |
| WO | WO 0192381 A1 * | 12/2001 | | B82Y 30/00 |
| WO | WO2011155444 | 8/2011 | | |
| WO | WO 2011104472 | 9/2011 | | |

OTHER PUBLICATIONS

Hills, Inc., "Hills_Inc_Bicomponent-Fibers-Chart," retrieved Apr. 12, 2012.

Extended European Search Report dated Aug. 2, 2013 for Application No. 13170928.9-1308.

Chinese Office Action dated Jun. 3, 2016, for Application No. 201310236257.2.

Chinese Office Action dated Jan. 19, 2017, for Application No. 201310236257.2.

Chinese Office Action dated Jul. 25, 2017, for Application No. 201310236257.2.

Russian Office Action dated Apr. 19, 2017, for Application No. 2013126908/05.

Gulf Cooperation Council, Examination Report for GC 2013-24638 dated Oct. 19, 2017.

Japanese Office Action for 2013-121594 dated Oct. 3, 2017.

* cited by examiner

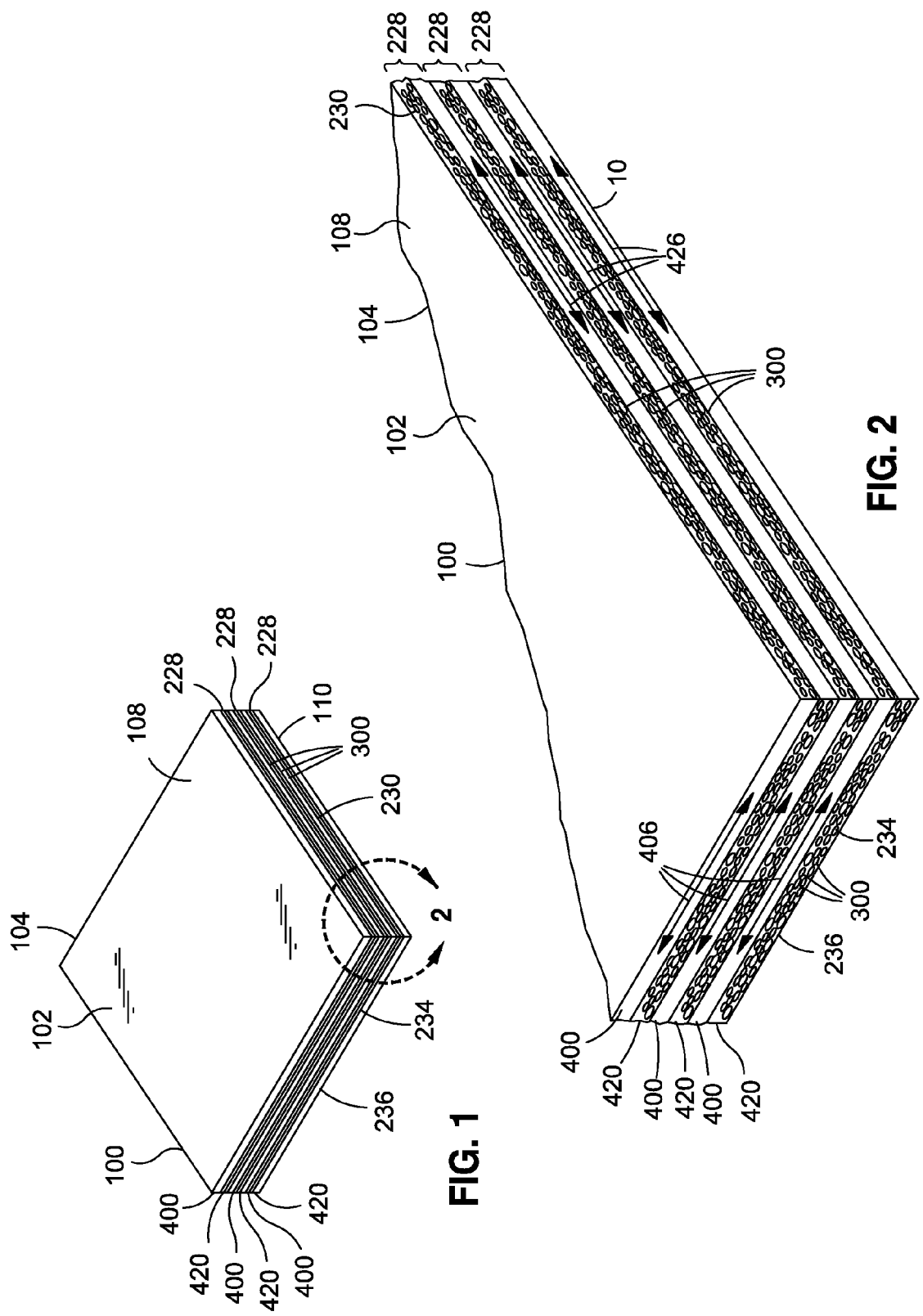

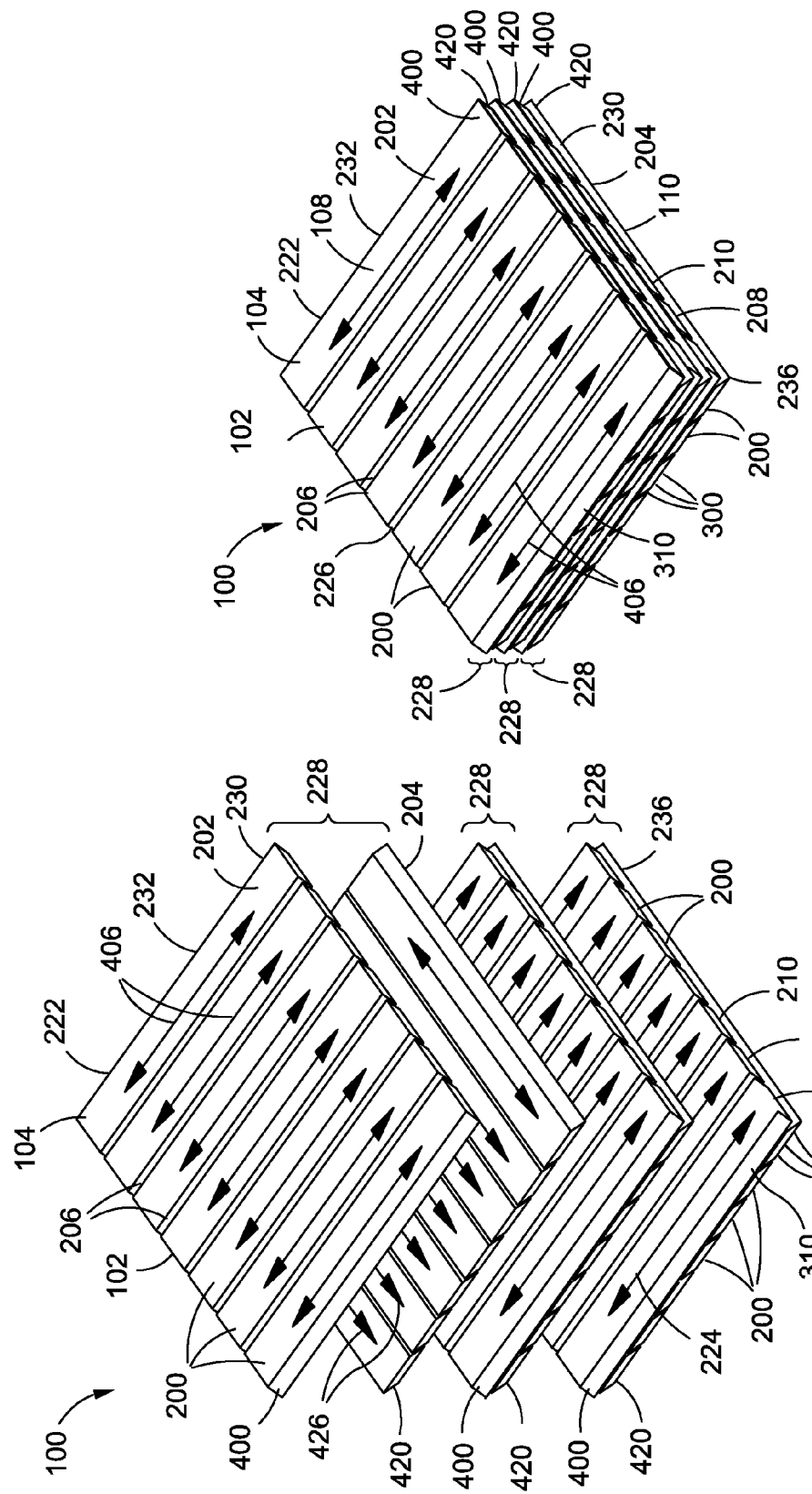

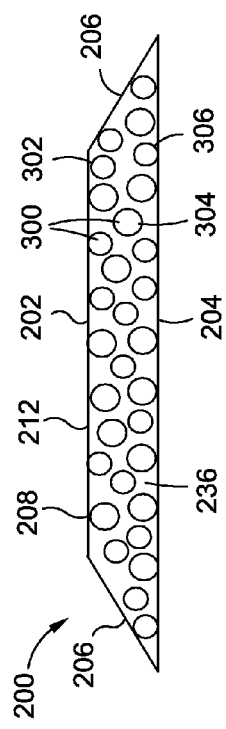
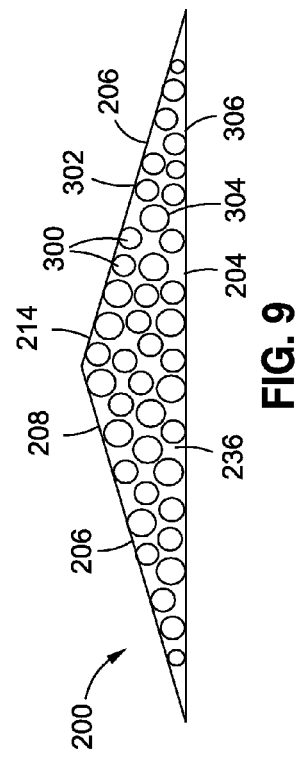
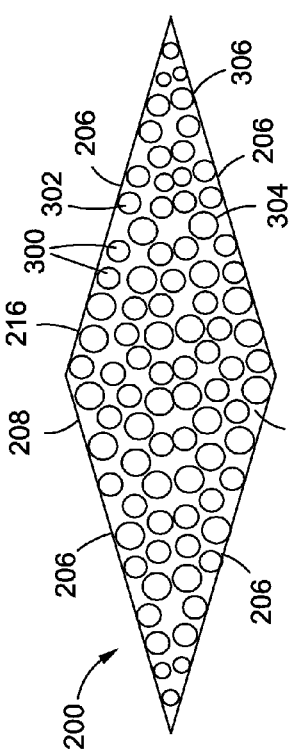

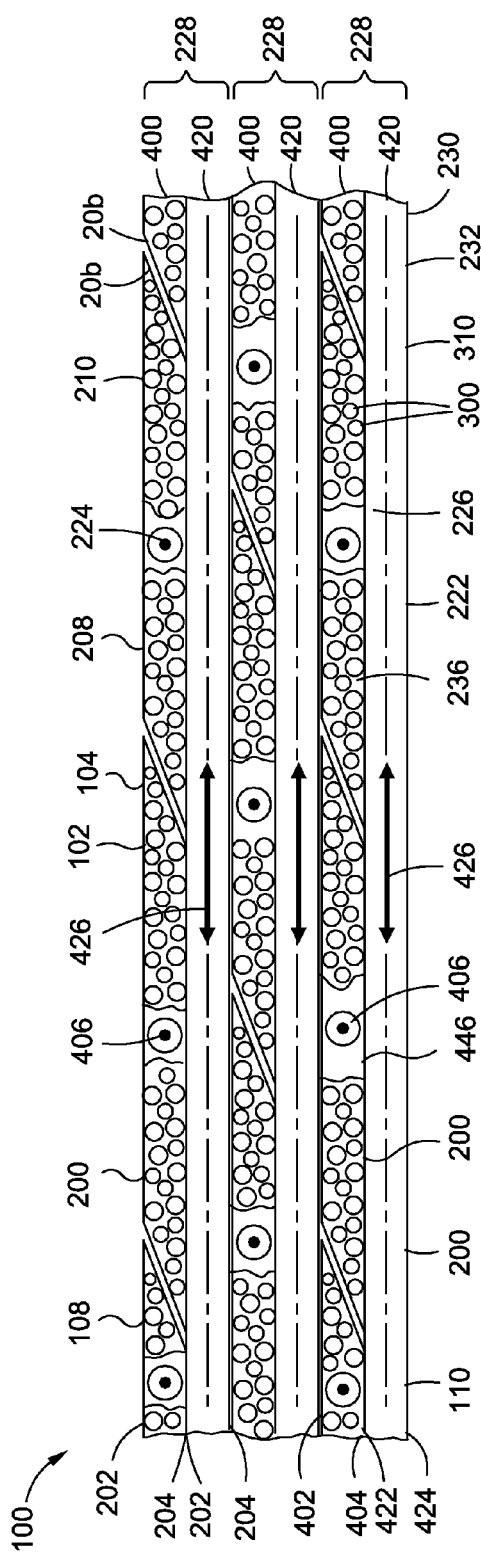
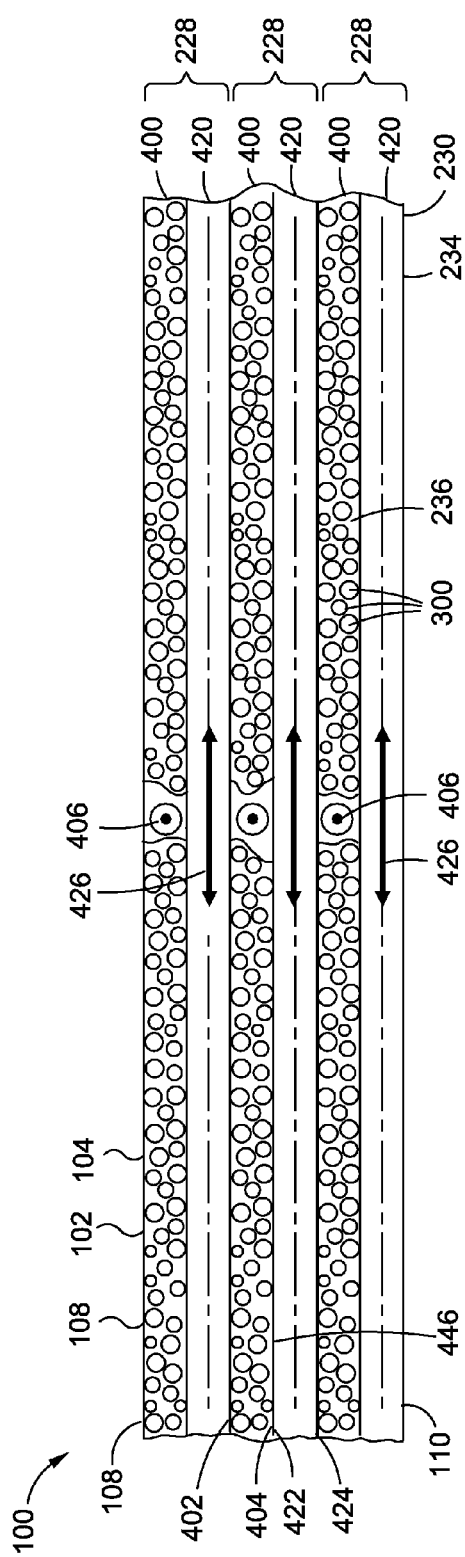

MACRO FIBER FOR COMPOSITE ARTICLES

CROSS-REFERENCE TO RELATED APPLICATIONS

The present application is a divisional application of and claims priority to pending U.S. application Ser. No. 13/523,108 filed on Jun. 14, 2012, and entitled BICOMPONENT FIBERS CONTAINING NANO-FILAMENTS FOR USE IN OPTICALLY TRANSPARENT COMPOSITES, the entire contents of which is expressly incorporated by reference herein.

FIELD

The present disclosure relates generally to composites and, more particularly, to fiber-reinforced composite articles having improved ballistic and optical performance.

BACKGROUND

Glass is widely used as a transparency in a variety of applications due to its superior optical qualities. For example, glass is commonly used as a glazing material or as an architectural material for buildings. Glass is also commonly used as a transparency in vehicular applications. Unfortunately, glass is a relatively dense material and is also relatively brittle such that relatively large thicknesses are required to provide sufficient strength for resisting shattering when the glass is impacted by an object such as a projectile.

In attempts to avoid the weight penalty associated with glass, transparencies may be fabricated from polymeric materials. For example, transparencies may be formed of optically transparent monolithic polymers such as acrylic which is less dense than glass and which possesses suitable optical properties. Unfortunately, acrylic is a relatively low strength material making it generally unsuitable for many applications where high impact resistance is required.

In consideration of the weight penalties associated with glass and the strength limitations associated with monolithic polymers, manufacturers have also fabricated composite transparencies using conventional fibers such as ribbon-shaped fibers embedded in a matrix. Unfortunately, conventional fibers are typically spaced apart from one another in the matrix resulting in a portion of the incident light passing through gaps between the fibers. When there is a mismatch in the refractive index of the matrix and the fibers, there is a deleterious effect on the optics of the transparency due differences in the optical path lengths of the light rays and differences in the resultant angles of the light rays depending on whether the light rays pass through the main portions of the fibers or whether the light rays pass through the side surfaces of the fibers. The consequence of the differences in the optical path lengths and resultant angles is that an object viewed through the transparency may appear blurred.

As can be seen, there exists a need in the art for a high-strength transparent composite article having a fiber configuration that provides improved optical performance with reduced optical distortion.

BRIEF SUMMARY

The above-described needs associated with composite articles are specifically addressed and alleviated by the present disclosure which, in an embodiment, provides a macro fiber for a composite article. The macro fiber includes a plurality of nano-filaments or inner fibers which may each have an inner fiber final cross-sectional size of less than approximately 100 nanometers. The inner fibers may be surrounded by matrix material.

In a further embodiment, disclosed is a composite article which may include a plurality of macro fibers. Each one of the macro fibers may include a plurality of inner fibers. Each one of the inner fibers may have an inner fiber final cross-sectional size of less than approximately 100 nanometers. Each macro fiber may include a matrix material surrounding the inner fibers. Each macro fiber may have a predetermined cross-sectional shape.

Also disclosed is a method of manufacturing a macro fiber. The method may include the step of forming a plurality of inner fibers each having an inner fiber final cross-sectional size (e.g., a final diameter) of less than approximately 100 nanometers. The method may additionally include surrounding the inner fibers with matrix material to form a macro fiber. The method may also include forming the macro fiber in a predetermined cross-sectional shape.

In a further embodiment, disclosed is a method of forming a composite article. The method may include the step of providing a plurality of macro fibers. Each one of the macro fibers may include a plurality of inner fibers surrounded by matrix material. Each one of the inner fibers may have an inner fiber final cross-sectional size of less than approximately 100 nanometers. The method may include reducing a viscosity of the matrix material to cause intermingling of the matrix material among the plurality of the macro fibers, and curing and/or solidifying the matrix material to form a composite article.

Also disclosed is a method of using a composite article which may include providing a composite article having a plurality of macro fibers wherein each one of the macro fibers includes a plurality of inner fibers surrounded by matrix material. Each one of the inner fibers may have an inner fiber final cross-sectional size of less than approximately 100 nanometers. The method of using the composite article may include placing the composite article in a non-loaded condition, and placing the composite article in a loaded condition.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective view of an embodiment of a composite article in an embodiment comprising a plurality of layers containing inner fibers embedded in matrix material;

FIG. 2 is an enlarged perspective view of a portion of the composite article of FIG. 1 and illustrating the inner fibers;

FIG. 3 is perspective view of a plurality of macro fibers in a layup configuration and wherein each macro fiber contains a plurality of the inner fibers;

FIG. 4 is a perspective view of the plurality of macro fibers of FIG. 3 arranged in a stacked configuration prior to heating and/or consolidation;

FIG. 8 is a cross-sectional view of a macro fiber in a trapezoid configuration;

FIG. 9 is a cross-sectional view of a macro fiber in a triangle configuration;

FIG. 10 is a cross-sectional view of a macro fiber in a diamond configuration;

FIG. 11 is a side view of a composite article in a layup configuration including a plurality of first and second structural layers;

FIG. 12 is a side view of the composite article of FIG. 11 in a consolidation configuration;

DETAILED DESCRIPTION

Figure 5:
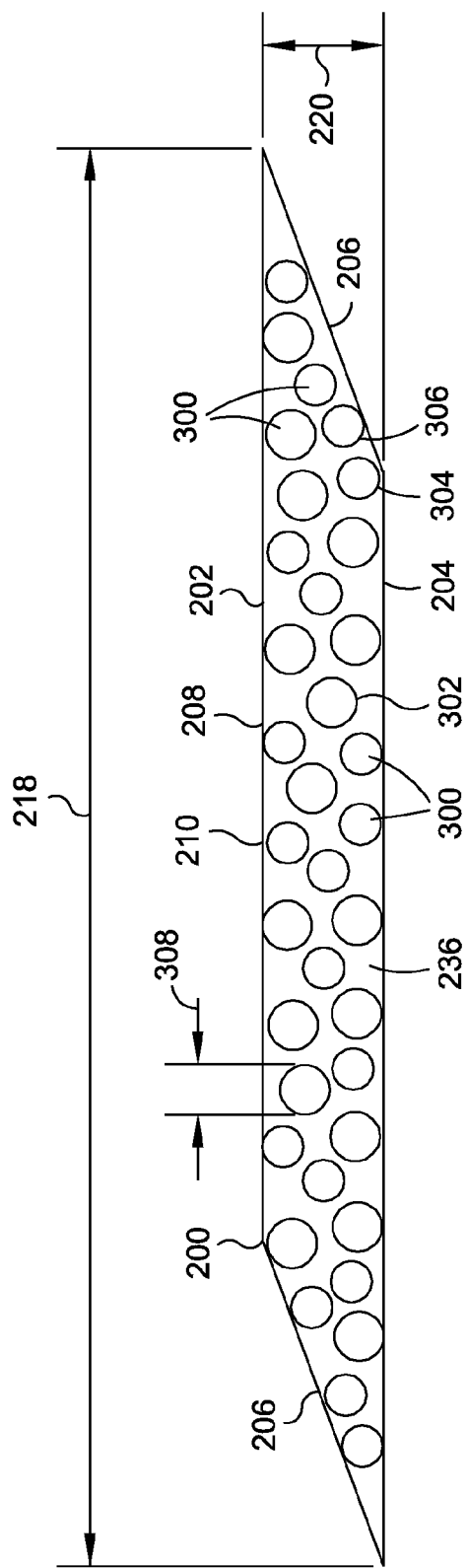
FIG. 5 is a cross-sectional view of an embodiment of one of the macro fibers containing a plurality of inner fibers.

Referring now to the drawings wherein the showings are for purposes of illustrating preferred and various embodiments of the disclosure, shown in FIG. 1 is an embodiment of a composite article 100. The composite article 100 is configured as a composite panel 104 having upper and lower sides 108, 110. The composite article 100 may be fabricated using a plurality of structural layers arranged in a stacked formation 230. For example, the composite article may be comprised of a plurality of structural layers such as the first and second structural layers 400, 420 illustrated in FIG. 1. Each one of the first and second structural layers 400, 420 may be formed using a plurality of macro fibers 200 as shown in FIG. 5. Each one of the macro fibers 200 may be comprised of a plurality of substantially unidirectional inner fibers 300 (FIG. 5) surrounded by matrix material 236 (FIG. 5) as described in greater detail below. The inner fibers 300 may have an inner fiber length 310 (FIG. 3) that may be aligned with the macro fiber length 222 (FIG. 3).

Referring to FIG. 2, shown is a portion of the composite article 100 of FIG. 1 and illustrating the inner fibers 300 in first and second structural layers 400, 420. Each one of the first and second structural layers 400, 420 has a stretched direction 406, 426. The composite article 100 may be configured such that the stretched direction of the structural layers may be oriented in any direction relative to the stretched direction of any of the other structural layers in the composite article 100. For example, in FIG. 2, the stretched direction 406 of the first structural layer 400 in each couplet 228 is oriented generally perpendicular to the stretched direction 426 of the second structural layer 420 of the couplet 228. By orienting the stretched direction 406 of a first structural layer 400 in a couplet 228 generally perpendicular to the stretched direction 406 of a second structural layer 420 in a couplet 228, the ballistic performance of the composite article may be improved as described below.

However, the stretched direction 406 of the first structural layer 400 may be oriented at any non-perpendicular angle (not shown) relative to the stretched direction 426 of the second structural layer 420 and which may also result in an improvement in the ballistic performance and/or strength properties of the composite article 100 relative to an embodiment wherein the stretched directions of the structural layers are oriented generally parallel to one another. In this regard, the composite article 100 may also be provided in an embodiment wherein the stretched direction one or more of the structural layers may be oriented generally parallel (not shown) to one another.

FIGS. 3-4 illustrate a plurality of macro fibers 200 in a layup configuration 232 during fabrication of the composite article 100. Each macro fiber 200 has a stretched direction 224 along the macro fiber length 222. Each macro fiber 200 may be formed with a predetermined cross-sectional shape 208 to facilitate the layup of the macro fibers 200 in the first and second structural layers 400, 420. For example, each macro fiber 200 may be formed in a cross-sectional shape 208 having macro fiber side surfaces 206 and at least one substantially planar macro fiber upper surface 202 and/or a substantially planar macro fiber lower surface 204. In FIG. 3, each macro fiber 200 has a parallelogram 210 cross-sectional shape 208 although the macro fibers 200 may be formed in other suitable cross-sectional shapes that may facilitate the positioning of the macro fibers 200 in relatively close proximity with one another. The macro fiber upper and lower surfaces 202, 204 may be substantially parallel and planar which may facilitate placing the macro fibers 200 in intimate contact with the macro fibers 200 of adjacent first and second structural layers 400, 420.

FIG. 4 shows the first and second structural layers 400, 420 arranged as couplets 228 in a stacked formation 230. Although three couplets 228 are shown, any number of couplets 228 may be included to form a composite article 100 of any desired thickness. The macro fiber side surfaces 206 may be placed in side-by-side arrangement 226 in relatively close proximity to one another. Once the first and second structural layers 400, 420 are arranged in stacked formation 230, heat (not shown) and/or pressure (not shown) may be applied to reduce the viscosity of the matrix material 236. The application of heat may reduce the viscosity of the matrix material 236 resulting in the intermingling of the matrix material 236 of adjacent macro fibers 200. The intermingling of the matrix material 236 may eliminate gaps or voids between the macro fiber side surfaces 206 and/or between the macro fiber upper and lower surfaces 202, 204 of adjacent macro fibers 200 as shown in FIG. 12 and described in greater detail below. The application of pressure may aid in the consolidation, curing, and/or solidification of the matrix material of the composite article 100.

Referring to FIG. 5, shown is an embodiment of a macro fiber 200 in a parallelogram 210 cross-sectional shape 208. Each macro fiber 200 may include a plurality of relatively small cross-sectional size (e.g., small diameter) nano-filaments or inner fibers 300 surrounded by matrix material 236. The matrix material 236 may be applied substantially simultaneous with the forming of the inner fibers 300. Advantageously, by co-forming the inner fibers 300 substantially simultaneous with the application of the surrounding matrix material 236, the time, expense, and complexity associated with the separate application of resin in conventional composites manufacturing may be reduced or avoided. In addition, co-forming the inner fibers 300 with the matrix material 236 may result in a more precise control of the final dimensions (e.g., the overall height or thickness) of the composite article 100 (FIG. 3) and more precise control of the fiber volume fraction of the composite article 100. More precise control of the geometry and fiber volume fraction may result in improved optical performance and/or improved ballistic performance of the composite article 100.

The inner fibers 300 and the matrix material 236 may be formed of material that is at least partially light-transmissive within a predetermined spectrum of light such as within the visible spectrum and/or infrared spectrum or within other wavelength bands. Each one of the inner fibers 300 may have an inner fiber final cross-sectional size 308. For non-circular (not shown) inner fiber 300 cross-sectional shapes, the inner fiber final cross-sectional size 308 may be defined as the longest distance across the cross-sectional shape of the inner fiber 300.

The inner fibers 300 may initially have a cross-sectional size that may be greater than their inner fiber final cross-sectional size 308. Each one of the inner fibers 300 may be stretched along a lengthwise direction during or after formation of the inner fiber 300 which may reduce the cross-sectional size of the inner fiber 300 down to an inner fiber final cross-sectional size 308. In an embodiment, the inner fiber final cross-sectional size 308 may be less than approximately one-quarter of the wavelength of a lower end of a predetermined range of light to which the composite article 100 may be exposed. For example, for composite articles 100 intended to be substantially optically transparent in the visible spectrum wherein the wavelength range is between approximately 400 nanometers (nm) and 750 nm, each one of the inner fibers 300 may have an inner fiber final cross-sectional size 308 of less than approximately 100 nm. For composite articles configured to be substantially optically transparent in the near-infrared spectrum wherein the wavelength range is between approximately 750 nm to 1.4 microns, each one of the inner fibers 300 may have an inner fiber final cross-sectional size 308 that is less than approximately 190 nm.

Advantageously, by providing the inner fibers 300 in an inner fiber final cross-sectional size (e.g., a final diameter) less than approximately one-quarter of the wavelength of light rays incident on the composite article, the refractive index of the inner fibers 300 and the matrix material 236 may not be separable and instead may be defined or characterized by an average of the optical properties of the combination of the inner fibers 300 and the matrix material 236. For example, the inner fibers 300 may be formed of material having a certain refractive index and a temperature coefficient of refractive index. Likewise, the matrix material 236 may have a refractive index and a temperature coefficient of refractive index that may be different than the refractive index and a temperature coefficient of refractive index of the inner fibers 300. The optical properties (e.g., the refractive index) of the macro fiber 200 may be defined as a weighted average of the optical properties (e.g., the refractive index) of the matrix material 236 and the inner fiber 300 material.

In FIG. 5, the inner fibers 300 are shown as having different inner fiber final cross-sectional sizes 308 (e.g., diameters) and being arranged at non-uniform spacings between one another. In this regard, the inner fibers 300 may be arranged in a pseudo-random spacing to minimize potential adverse optical effects that may occur with uniform spacing of the inner fibers 300. However, one or more macro fibers 200 may be formed having inner fibers 300 that are substantially uniform in diameter and/or wherein the inner fibers 300 are arranged in a substantially uniform (not shown) spacing. Although the inner fibers 300 are shown as having a generally circular cross-sectional shape 304, one or more of the inner fibers 300 may be provided in specific, non-circular (not shown) cross-sectional shapes to improve the optical performance of the composite article 100 (FIG. 1). For example, one or more of the inner fibers 300 may be provided in cross-sectional shapes having one or more substantially planar surfaces (not shown) which may reduce optical distortion of light passing through the composite article 100.

Each macro fiber 200 (FIG. 5) may be stretched along a stretched direction 224 (FIG. 3) during formation of the macro fiber 200 and/or after formation of the macro fiber 200. As shown in FIGS. 3-4, the stretched direction 224 of the macro fibers 200 in the first and second structural layer 400, 420 (FIG. 3) defines the respective stretched direction 406, 426 of the first and second structural layer 400, 420 as shown in FIGS. 1-2. The stretching of each macro fiber 200 may include the stretching of the inner fibers 300 (FIG. 5) and the stretching of the matrix material 236 (FIG. 5). The inner fibers 300 may be stretched to a predetermined stretching ratio to attain a desired strength property such as a desired ultimate tensile strength of the inner fibers 300. The inner fibers 300 may be stretched prior to forming the macro fibers 200 or the inner fibers 300 may be stretched substantially simultaneous with the forming of the macro fibers 200. Advantageously, the stretching of the inner fibers 300 may significantly increase the tensile strength and/or tensile modulus of the inner fibers 300. The increase in the strength properties of the inner fibers 300 due to stretching of the inner fibers 300 may result in an increase in the global strength properties of the composite article 100 such as the specific strength and/or specific stiffness of the composite article 100 (FIG. 1).

In FIG. 5, the parallelogram 210 cross-sectional shape 208 of the macro fiber 200 includes the macro fiber upper and lower surfaces 202, 204 and the macro fiber side surfaces 206. The macro fiber side surfaces 206 may be oriented non-perpendicularly relative to the macro fiber upper and lower surfaces 202, 204. The non-perpendicular orientation of the macro fiber side surfaces 206 may facilitate alignment of adjacent macro fibers 200 in side-by-side arrangement 226 with one another as shown in FIGS. 3-4. The non-perpendicular orientation of the macro fiber side surfaces 206 may also facilitate the intermingling of the matrix material 236 at the macro fiber side surfaces 206 when the viscosity of the matrix material 236 is reduced such as by heating and/or during the application of pressure during consolidation of the first and second structural layers 400, 420 (FIG. 3). The macro fiber upper and lower surfaces 202, 204 may be oriented substantially parallel to one another which may facilitate the layup of a plurality of macro fibers 200 in substantially close or intimate contact with one another.

In FIG. 5, each macro fiber 200 has a macro fiber cross-sectional shape 208 that may be comprised of or defined by the matrix material 236. In this arrangement, each one of the inner fibers 300 in a macro fiber 200 may be set back or spaced away from the perimeter surface of the macro fiber cross-sectional shape 208 such that each one of the inner fibers 300 is fully surrounded by matrix material 236. However, the macro fiber cross-sectional shape 208 may be defined by a combination of the matrix material 236 and by portions of the inner fiber surface 302 of one or more of the inner fibers 300.

Referring still to FIG. 5, each macro fiber 200 has a macro fiber width 218 and a macro fiber thickness 220. In an embodiment, the macro fiber 200 may be provided with a maximum macro fiber thickness 220 in a range of from approximately 3 microns to 5000 microns. However, the macro fiber 200 may be provided in any macro fiber width 218 or any macro fiber thickness 220, without limitation. The macro fiber 200 may have a generally elongated cross-sectional shape 208 which is preferably formed at a relatively high aspect ratio to minimize the quantity of individual macro fibers 200 required to span a desired width of the first structural layer 400 (FIG. 3) or second structural layer 420 (FIG. 3) or other structural layers (not shown) during layup of the macro fibers 200. The macro fiber 200 aspect ratio may be defined as the ratio of the macro fiber width 218 to the macro fiber thickness 220. In an embodiment, the aspect ratio may be within the range of from approximately 3 to approximately 500 although the macro fiber 200 may be formed in any aspect ratio.

Although FIG. 5 shows the macro fiber 200 in a parallelogram 210 shape, the macro fiber 200 may be provided in any one of a variety of alternative shapes and configurations, without limitation. For example, the macro fiber 200 may be provided as a sheet 242 (FIG. 7), a trapezoidal 212 shape (FIG. 8), a triangular 214 shape (FIG. 9), a diamond shape 216 (FIG. 10), or in other shapes. In addition, the macro fiber 200 is not limited to cross-sectional shapes 208 that are substantially planar but may also include cross-sectional shapes 208 that are at least partially curved. For example, the macro fiber 200 cross-sectional shape 208 may include a circle 306, a partially-circular shape, a closed semi-circle, a kidney shape, an oval, an ellipsoid, and any one of a variety of other shapes.

Figure 6:
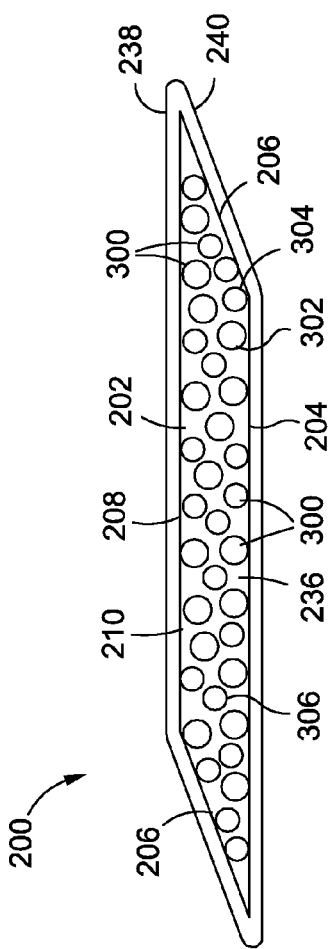
FIG. 6 is a cross-sectional view of a macro fiber having an outer sheath comprised of sacrificial material.

FIG. 6 shows an embodiment of a macro fiber 200 having an outer sheath 238 applied to the macro fiber 200. The outer sheath 238 may comprise a sacrificial material 240 applied to the macro fiber 200 to preserve the cross-sectional shape 208 of the macro fiber 200 during formation. The sacrificial material 240 may be applied to the macro fiber 200 substantially simultaneous with the forming of the inner fibers 300 and matrix material 236. The sacrificial material 240 of the outer sheath 238 may be formed of polymeric material that is complementary to the inner fibers 300 and the matrix material 236. The sacrificial material 240 may comprise a generally dissolvable material that may be washed away or otherwise removed after formation of the macro fiber 200. For example, the sacrificial material 240 may be dissolvable in water or in a solvent or the sacrificial material 240 may be removed by other chemical means or by mechanical means. Advantageously, the sacrificial material 240 may improve the dimensional control of the macro fiber 200 during formation by minimizing rounding of the macro fiber 200 surfaces and macro fiber 200 corners due to surface-energy-effects on the cross-sectional shape 208 of the macro fiber 200.

Figure 7:
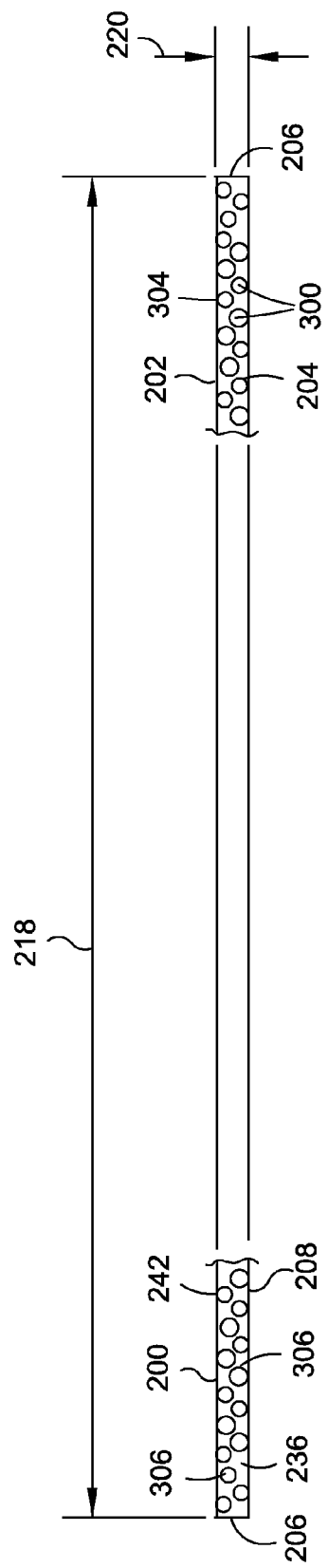
FIG. 7 is a cross-sectional view of a macro fiber in a sheet configuration.

FIG. 7 shows an embodiment of a macro fiber 200 in a sheet 242 cross-sectional shape 208. The sheet 242 may be provided with a relatively high aspect ratio of macro fiber width 218 to macro fiber thickness 220. In an embodiment, the sheet 242 may have an aspect ratio of macro fiber width 218 to macro fiber thickness 220 of at least approximately 10. By forming the macro fiber 200 in a sheet 242 embodiment, the total quantity of macro fibers 200 required to form a structural layer may be reduced which may result in a reduced amount of time required to lay up a composite article 100 (FIG. 1).

FIG. 8 illustrates a trapezoidal 212 cross-sectional shape 208 of the macro fiber 200 having substantially planar macro fiber upper and lower surfaces 202, 204 that may be substantially parallel to one another. The macro fiber side surfaces 206 may be oriented in non-parallel relation to one another. The trapezoidal 212 cross-sectional shape 208 of the macro fiber 200 may be provided in a relatively high aspect ratio which may reduce fabrication time for a composite article 100 (FIG. 1). During the layup of a composite article, a plurality of trapezoidal 212 macro fibers 200 may be positioned in side-by-side arrangement 226 (FIG. 4) in first and second structural layers 400, 420 (FIG. 3). A plurality of the first and second structural layers 400, 420 and additional structural layers (not shown) may be arranged in a stacked formation 230 (FIGS. 3-4) and may be heated to reduce the viscosity of the matrix material 236 and allow the intermingling of the matrix material 236 of adjacent macro fibers 200. The layup may be cured and/or solidified to form a composite article 100.

FIG. 9 illustrates a triangular 214 cross-sectional shape 208 of the macro fiber 200 having a macro fiber lower surface 204 and a pair of macro fiber side surfaces 206. The aspect ratio of the triangular macro fiber 200 is preferably large to reduce the total quantity of macro fibers 200 required to form a structural layer. The triangular macro fiber 200 may facilitate registration or alignment of the macro fibers 200 relative to one another in the first and second structural layers 400, 420 (FIG. 3) when laying up a composite article 100. For example, a first structural layer 400 (FIG. 3) of the triangular 214 macro fibers 200 may be arranged in an upright orientation and in side-by-side arrangement (not shown) to one another. A second structural layer 420 (FIG. 3) of inverted (not shown) triangular 214 macro fibers 200 may be nested between the upright triangular 214 macro fibers 200. Each pair of first and second structural layers 400, 420 may comprise a couplet 228 (FIG. 3). A plurality of the couplets 228 may be arranged in stacked formation 230 (FIG. 3) (not shown) and may be processed in a manner described above to form a composite article 100.

FIG. 10 illustrates a diamond 216 cross-sectional shape 208 of the macro fiber 200 having two pairs of macro fiber side surfaces 206. A plurality of the diamond 216 macro fibers 200 may be arranged in first and second structural layers 400, 420 (FIG. 3) or more structural layers in a manner similar to that described above with regard to the triangular 214 (FIG. 9) macro fibers 200. Heat and/or pressure may be applied to reduce the viscosity of the matrix material 236 and/or consolidate the first and second structural layers 400, 420 followed by curing and/or solidification to form the composite article 100 (FIG. 1).

FIG. 11 is side view of a composite article 100 in a layup configuration 232. The composite article 100 includes a plurality of the first and second structural layers 400, 420 forming a plurality of couplets 228. Each one of the first and second structural layers 400, 420 includes macro fibers 200. The stretched direction 406 of the first structural layers 400 may be oriented perpendicularly relative to the stretched direction 426 of the second structural layers 420. However, the stretched direction the structural layers may be oriented in any direction relative to the stretched direction of other structural layers to achieve desired strength properties and/or desired ballistic properties of the composite article 100. For example, the stretched direction one or more of structural layers may be oriented at any non-perpendicular angle (e.g., at 15°, 22.5°, 45°, 60°, 75°, etc.) relative to the stretched direction of one or more of the other structural layers in the composite article. In an embodiment, the stretched directions may by oriented in consideration of the primary structural load path (not shown) in the composite article 100.

In FIG. 11, the composite article 100 may be provided in an embodiment wherein the macro fiber side surfaces 206 may be positioned in relatively close proximity to one another or in contact with one another to minimize or prevent the occurrence of voids in the final composite article 100. The minimizing of the occurrence of voids may improve the strength properties and optical properties of the composite article 100. The macro fiber upper and lower surfaces 202, 204 may also be placed in substantially intimate contact with one another to minimize the occurrence of voids. Heat and/or pressure may be applied to the composite article 100 to reduce the viscosity of the matrix material 236 and allow intermingling thereof.

FIG. 12 is a side view of the composite article 100 in a consolidated configuration 234. The heating of the matrix material 236 and the resulting reduction in viscosity may cause intermingling of the matrix material 236 between adjacent macro fibers 200 (FIG. 11). In this manner, gaps between the macro fiber side surfaces 206 (FIG. 11) may be avoided or eliminated in the final composite article 100. The prevention or avoidance of gaps in the composite article 100 may minimize or eliminate the occurrence of optical distortions otherwise caused by light rays passing through gaps between conventional fibers (not shown). Pressure may be applied to a layup of the composite article 100 during the heating of the matrix material 236 to consolidate the composite article 100 and eliminate voids in the composite article 100. In addition, consolidation may improve the intermingling and infusion of the matrix material 236 throughout the composite article 100.

Figure 13:
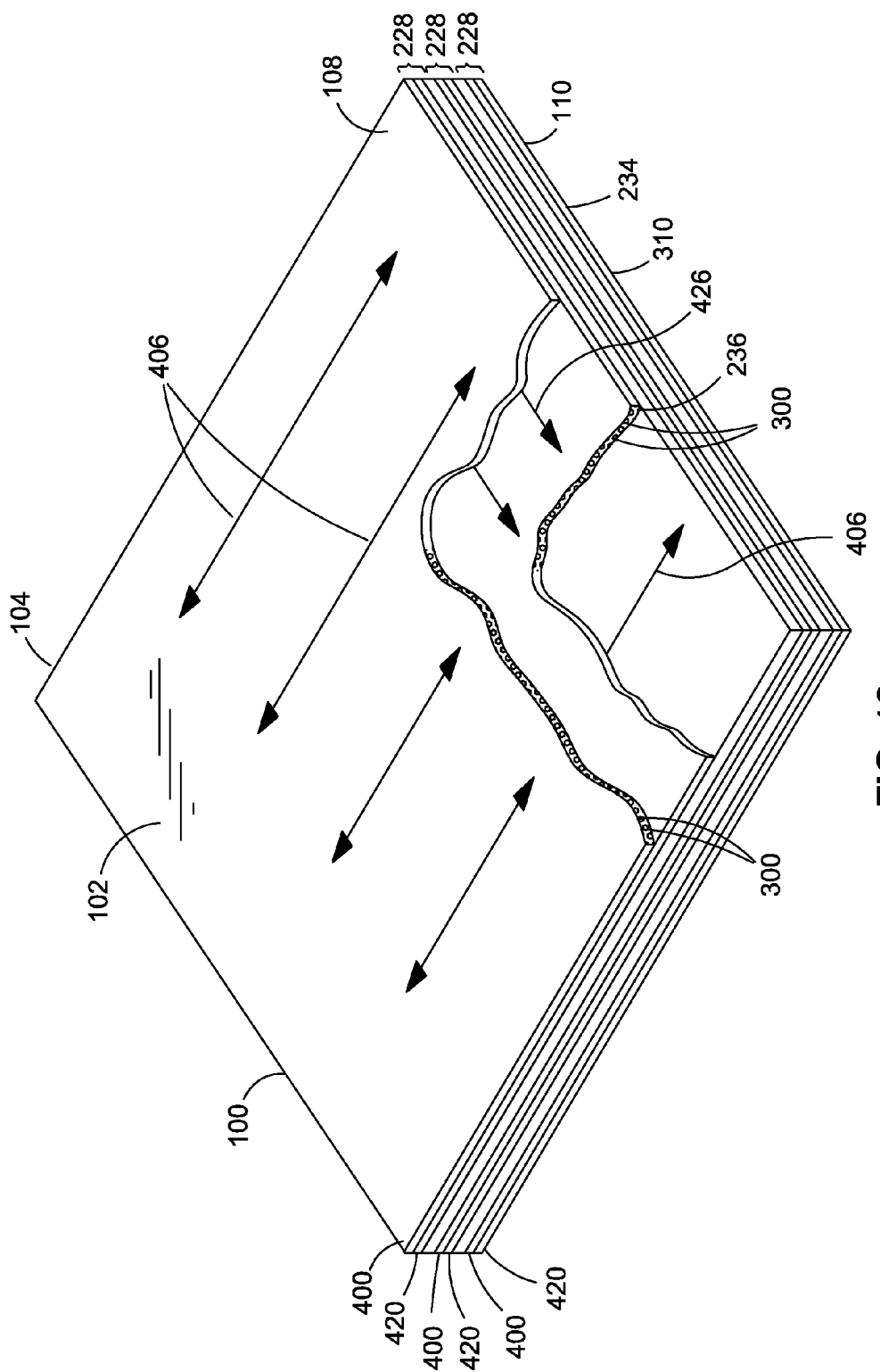
FIG. 13 is a perspective view of the composite article illustrating the uppermost first and second structural layer partially cutaway to illustrate the stretched directions of the alternating first and second structural layers.

FIG. 13 is a perspective view of the composite article 100 in an embodiment wherein the uppermost first and second structural layer 400, 420 are partially cut away to illustrate the stretched direction 406, 426 of the alternating first and second structural layers 400, 420. As indicated above, the stretching of the inner fibers 300 may significantly increase the tensile strength or tensile modulus of the inner fibers 300. The increase in the tensile strength or tensile modulus of the inner fibers 300 may improve the specific strength and/or specific stiffness of the composite article 100.

In any of the embodiments disclosed herein, the inner fibers 300 (FIG. 13) may be formed of any suitable thermoplastic material, thermosetting material, inorganic material, and/or glass material, without limitation. For example, the inner fibers 300 may be formed of a thermoplastic material comprising at least one of the following: acrylics, nylon, fluorocarbons, polyamides, polyethylenes, polyesters, polypropylenes, polycarbonates, polyurethanes, polyetheretherketone, polyetherketoneketone, polyetherimides, stretched polymers and any other suitable thermoplastic material. Likewise, the inner fibers 300 may be formed of a thermosetting material which may include any one of the following: polyurethanes, phenolics, polyimides, bismaleimides, polyesters, epoxies, silsesquioxanes and any other suitable thermoset material. In addition, the inner fibers 300 may be formed of an inorganic material including carbon, silicon carbide, boron, or other inorganic material. Even further, the inner fibers 300 may be formed of a glass material such as E-glass (alumino-borosilicate glass), S-glass (alumino silicate glass), pure silica, borosilicate glass, optical glass, and any other glass material, without limitation. For embodiments where the inner fibers 300 are stretched, the inner fibers 300 may be formed of a thermoplastic material.

In any of the embodiments disclosed herein, the matrix material 236 (FIG. 13) may comprise any suitable thermoplastic material or thermosetting material including, but not limited to, any of the above-mentioned thermoplastic or thermosetting materials from which the inner fibers 300 may be formed. Furthermore, in any of the embodiments disclosed herein, the matrix material 236 (FIG. 13) may comprise any suitable metallic material. Although the matrix material 236 and the materials for forming the inner fibers 300 may be substantially optically transparent as mentioned above, the matrix material 236 and/or the inner fibers 300 may be formed of substantially non-transparent material or opaque material.

In an embodiment, the matrix material 236 (FIG. 13) may be formed of a material that is different than the material of the inner fibers 300 (FIG. 13). However, the matrix material 236 and the inner fibers 300 may be formed of substantially the same or similar material. In an embodiment, the matrix material 236 and the inner fibers 300 may be formed of substantially the same material but wherein the molecular weight of the inner fibers 300 material may be higher than the molecular weight of the matrix material 236. The high molecular weight of the inner fiber 300 material may improve the strength properties and the ballistic performance of the composite article 100. By forming the matrix material 236 and the inner fibers 300 from the same material, the matrix material 236 and the inner fiber 300 material may have substantially equivalent indices of refraction and/or temperature coefficients of refractive index which may improve the optical performance of the composite article 100 relative to an arrangement where the matrix material 236 and the inner fiber 300 are formed of different materials. In an embodiment, the inner fibers 300 and/or the matrix material 236 may be formed of polyethylene due to its favorably high modulus of elasticity. For example, the inner fibers 300 may be formed of ultra-high molecular weight polyethylene such as SPECTRA' or DYNEEMA™ brand high density polyethylenes.

The composite article 100 may be configured in any one of a variety of different shapes, sizes and configurations as is not limited to the composite panel 104 shown in FIG. 1. Furthermore, the composite article 100 may be configured for use in any vehicular or non-vehicular application. For example, the composite article 100 may be configured as a transparency of a vehicle such as an aircraft. The composite article 100 may also comprise a windshield or a canopy of an aircraft. The composite article 100 may additionally be configured for use as a window in any vehicular or non-vehicular application. Even further, the composite article 100 may be implemented as a membrane, an armor panel, a structural panel, an architectural panel, a non-structural panel or article, or in any other implementation of the composite article, without limitation.

Figure 14:
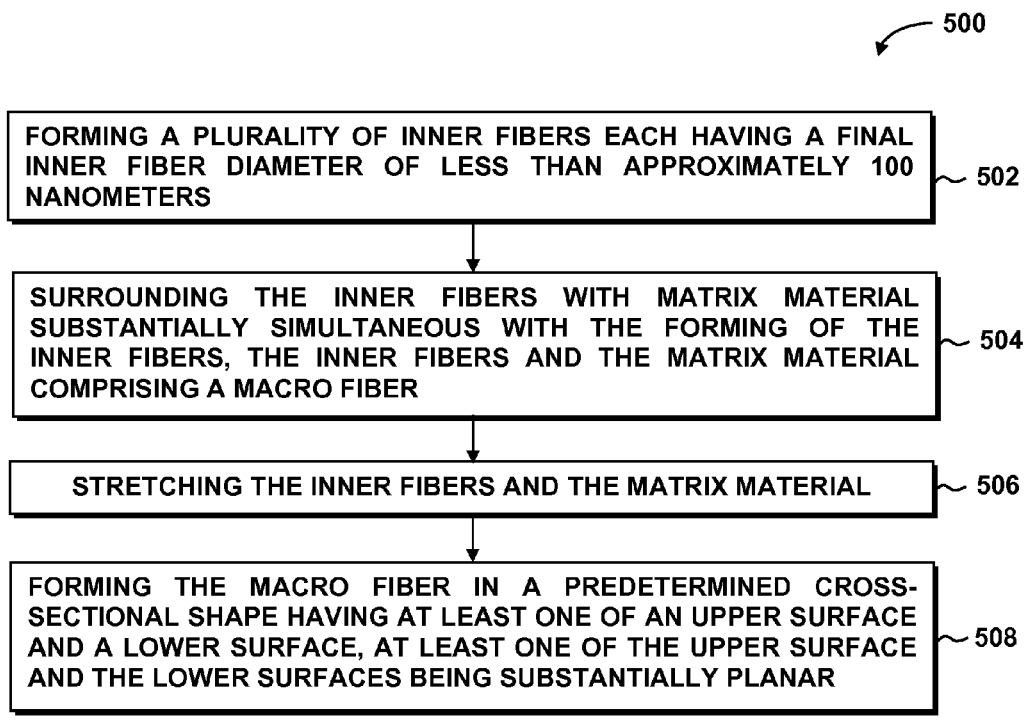
FIG. 14 is a flow chart illustrating one or more operations that may be included in a method of manufacturing a macro fiber.

FIG. 14 is a flow chart illustrating an embodiment of a method 500 of manufacturing a macro fiber 200. Step 502 of the method 500 of FIG. 14 may include forming a plurality of inner fibers 300 (FIG. 5) each having an inner fiber final cross-sectional size 308 (FIG. 5) of less than approximately 100 nanometers. In an embodiment, the method may initially include selecting a wavelength band of interest to which the composite article 100 (FIG. 3) may be exposed during service. The inner fibers 300 may initially have a cross-sectional size greater than their inner fiber final cross-sectional size 308 and may be stretched during formation or after formation along a lengthwise direction which may reduce the initial diameter down to an inner fiber final cross-sectional size 308 of the inner fiber 300. In an embodiment, each one of the inner fibers 300 may have an inner fiber final cross-sectional size 308 that may be less than approximately one-quarter of the wavelength at a lower end of the wavelength band of interest. For example, the lower end of the visible spectrum is approximately 400 nm such that the inner fibers 300 may be formed at an inner fiber final cross-sectional size 308 of less than approximately 100 nm.

Step 504 of the method 500 of FIG. 14 may include surrounding the inner fibers 300 (FIG. 4) with matrix material 236 (FIG. 3) to form a macro fiber 200 (FIG. 3). The inner fibers 300 may be oriented generally parallel to the macro fiber length 222 (FIG. 3). The inner fibers 300 may be formed substantially simultaneously with the matrix material 236. Advantageously, by co-forming the inner fibers 300 with the matrix material 236, the fiber volume fraction of the composite article 100 (FIG. 3) may be more precisely controlled relative to conventionally-manufactured composite articles. In addition, co-forming the matrix material 236 with the inner fibers 300 may reduce the amount of time required for fabricating composite articles 100. Furthermore, co-forming the matrix material 236 with the inner fibers 300 may eliminate the need for specialized resin-infusion equipment as may be required for infusing dry fiber preforms (not shown) with resin (not shown) in conventional composites manufacturing.

Step 506 of the method 500 of FIG. 14 may include stretching the inner fibers 300 and the matrix material 236. For example, the inner fibers 300 and the matrix material 236 may be stretched as the inner fibers 300 and the matrix material 236 are drawn from a nozzle (not shown). However, the inner fibers 300 may be stretched prior to forming the macro fibers 200. In an embodiment, the inner fibers 300 may be stretched following formation of the inner fibers 300 and prior to forming the macro fibers 200. Advantageously, the increase in the strength properties of the inner fibers 300 may be controlled by controlling the stretching ratio of the inner fibers 300.

Step 508 of the method 500 of FIG. 14 may include forming the macro fiber 200 (FIG. 6) in a predetermined cross-sectional shape 208 (FIG. 6). For example, the macro fiber 200 may be formed having a macro fiber upper surface 202 (FIG. 6), a macro fiber lower surface 204 (FIG. 6), and one or more macro fiber side surfaces 206 (FIG. 6). The cross-sectional shape 208 of the macro fiber 200 may be controlled such that the macro fiber upper surface 202 and the macro fiber lower surface 204 may be substantially planar and parallel. However, the macro fiber 200 may be formed in any suitable cross-sectional shape 208 that may facilitate laying up the macro fibers 200 to form structural layers. The macro fiber 200 may be formed in a cross-sectional shape 208 comprising a sheet 242 (FIG. 7), a polygon, a parallelogram 210 (FIG. 6), a trapezoid 212 (FIG. 8), and any one of a variety of other cross-sectional shapes 208.

Figure 15:
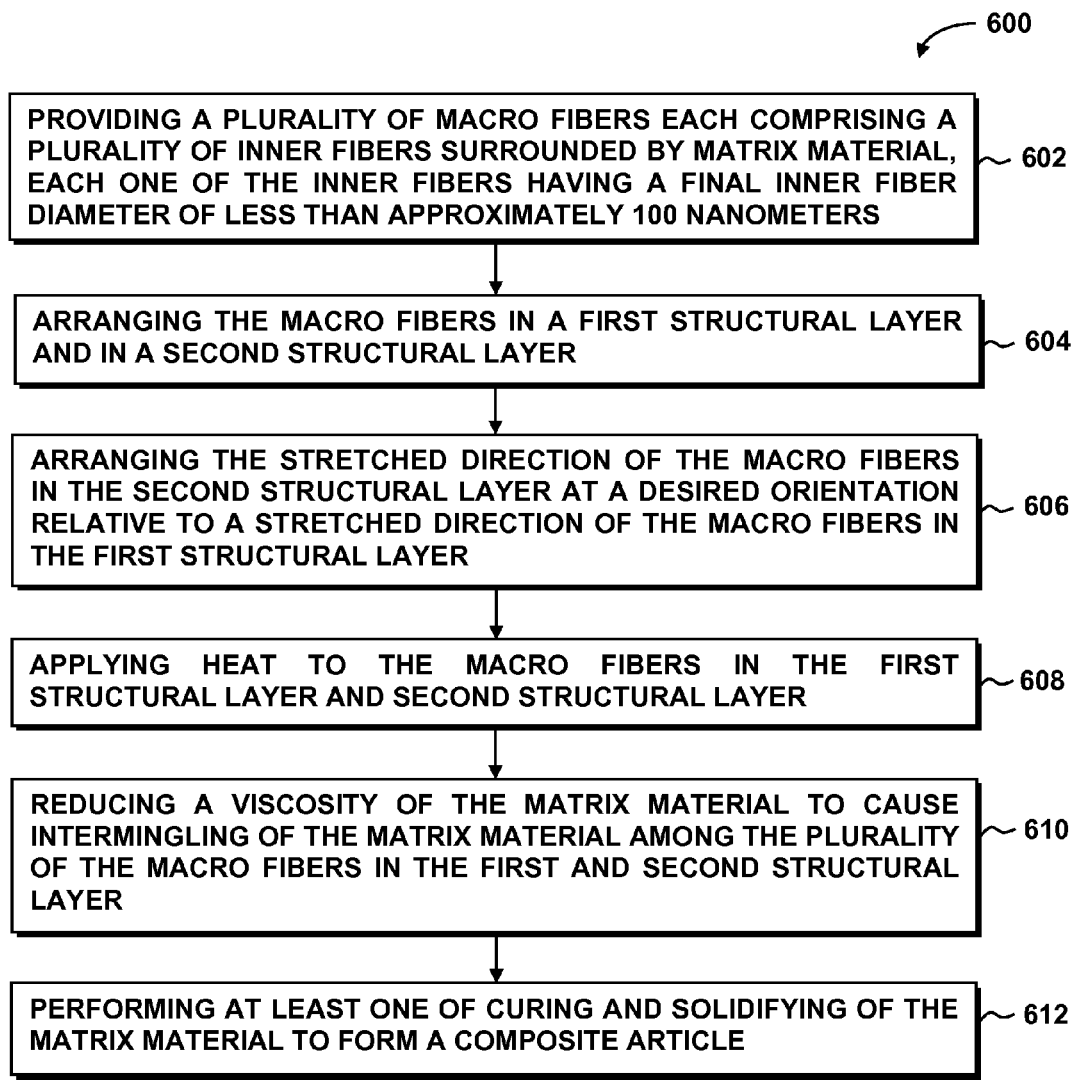
FIG. 15 is a flow chart illustrating one or more operations that may be included in a method of manufacturing a composite article.

FIG. 15 is a flow chart illustrating a method 600 having one or more operations that may be included in an embodiment of forming a composite article 100 (FIG. 1). Step 602 of the method 600 may include providing a plurality of macro fibers 200 (FIG. 5) wherein each one of the macro fibers 200 comprises a plurality of inner fibers 300 (FIG. 5) surrounded by matrix material 236 (FIG. 5). In an embodiment where the composite article 100 may be exposed to light in the visible spectrum, each one of the inner fibers 300 may be provided in an inner fiber final cross-sectional size 308 of less than approximately 100 nanometers. In this regard, the inner fibers may be stretched to an inner fiber final cross-sectional size 308 that is less than approximately one-quarter of the wavelength of a lower end of a predetermined range of light to which the composite article 100 may be exposed. However, the inner fibers 300 may be formed at any inner fiber final cross-sectional size, without limitation, based upon the wavelength at the low end of the wavelength band of light to which the composite article 100 may be exposed.

Step 604 of the method 600 of FIG. 15 may include arranging the macro fibers 200 (FIG. 11) in side-by-side arrangement 226 (FIG. 11) with one another in a structural layer. For example, in an embodiment, a plurality of the macro fibers 200 may be arranged in a first structural layer 400 and a plurality of the macro fibers 200 may be arranged in a second structural layer 420. A plurality of the structural layers may be arranged in a stacked formation. For example, in the embodiment shown in FIG. 11, the first and second structural layers 400, 420 may be positioned in relatively close proximity to one another such as in substantially intimate contact with one another.

Step 606 of the method 600 of FIG. 15 may include arranging the structural layers in a desired orientation relative to one another. For example, in the embodiment shown in FIGS. 3-4, the composite article 100 may be formed of a plurality of first and second structural layers 400, 420. The second structural layer 420 may be arranged such that the stretched direction 426 of the second structural layer 420 is oriented generally perpendicular to the stretched direction 406 of the first structural layer 400 as shown in FIG. 3. However, the first and second structural layer 400, 420 may be arranged such that the respective stretched directions 406, 426 are oriented non-perpendicular to one another by any amount including parallel orientations of the stretched directions. In an embodiment, the stretched directions of one or more of the structural layers may be arranged at specific angles relative to one another to achieve desired strength, ballistic, and/or optical performance in a composite article 100.

Step 608 of the method 600 of FIG. 15 may include applying heat to the macro fibers 200 (FIG. 11) of the structural layers. Heat may be applied by any suitable means. For example, heat may be applied by one or more heating elements (not shown). Heat may also be applied by radiation heating or by any other means for elevating the temperature of the matrix material 236 (FIG. 11).

Step 610 of the method 600 of FIG. 15 may include reducing the viscosity of the matrix material 236 (FIG. 12) such as due to the application of heat. The reduction in viscosity may allow for intermingling of the matrix material 236 among the macro fibers 200 (FIG. 12). In this regard, the matrix material 236 of each macro fiber 200 may intermingle with the matrix material 236 of adjacent macro fibers 200 such that the structural layers may be formed with substantially no gaps across a width of the structural layers. By forming the composite article 100 (FIG. 12) with no gaps, optical performance may be significantly improved relative to conventional composite articles (not shown) having gaps between fibers. Pressure may optionally be applied during application of heat to promote consolidation of the structural layers.

Step 612 of the method 600 of FIG. 15 may include curing and/or solidifying the matrix material 236 (FIG. 13) to form a composite article 100 (FIG. 13). As indicated above, the composite article 100 may be formed in any one of a variety of different shapes, sizes, and configurations, without limitation. Furthermore, the composite article 100 may be implemented in any one of a variety of vehicular and non-vehicular applications. Non-limiting examples of composite article 100 configurations include a windshield, a canopy, a window, a membrane, an armor panel, a structural panel, an architectural panel, and a non-structural article.

Advantageously, the macro fibers 200 (FIG. 11) as described above may facilitate a significant improvement in the optical performance of a composite article 100 (FIG. 11) relative to conventional composite articles using conventional fibers. In addition, the macro fibers 200 may result in more precise control of the fiber volume fraction of the composite article 100 which may improve the specific strength of the composite article 100 and the ballistic performance of the composite article 100.

Figure 16:
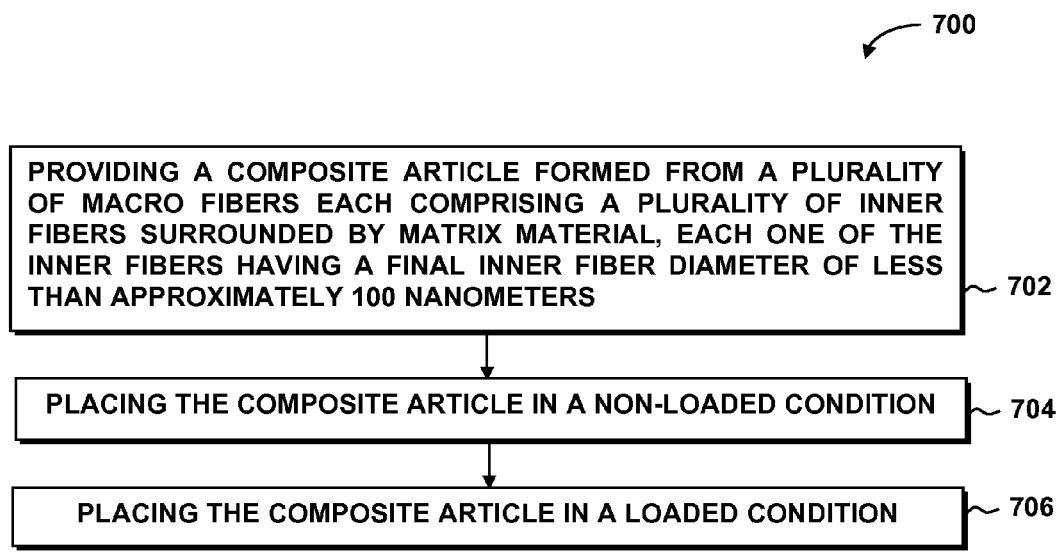
FIG. 16 is a flow chart illustrating one or more operations that may be included in a method of using a composite article.

FIG. 16 is a flowchart of a method 700 of using a composite article 100. Step 702 of the method 700 may include providing a composite article 100 having a plurality of macro fibers 200. Each one of the macro fibers 200 may include the plurality of inner fibers 300 surrounded by matrix material 236. Each one of the inner fibers 300 may have an inner fiber final cross-sectional size 308 of less than approximately 100 nanometers.

Step 704 of the method 700 of FIG. 16 may include placing or maintaining the composite article 100 (FIG. 1) in a non-loaded condition. The non-loaded condition may comprise a static condition of the composite article 100. For example, the composite article 100 may comprise a portion of a vehicle 801 (FIG. 17) that is static or substantially non-moving. In an embodiment, the vehicle 801 may comprise an aircraft 800 (FIG. 17).

Figure 17:
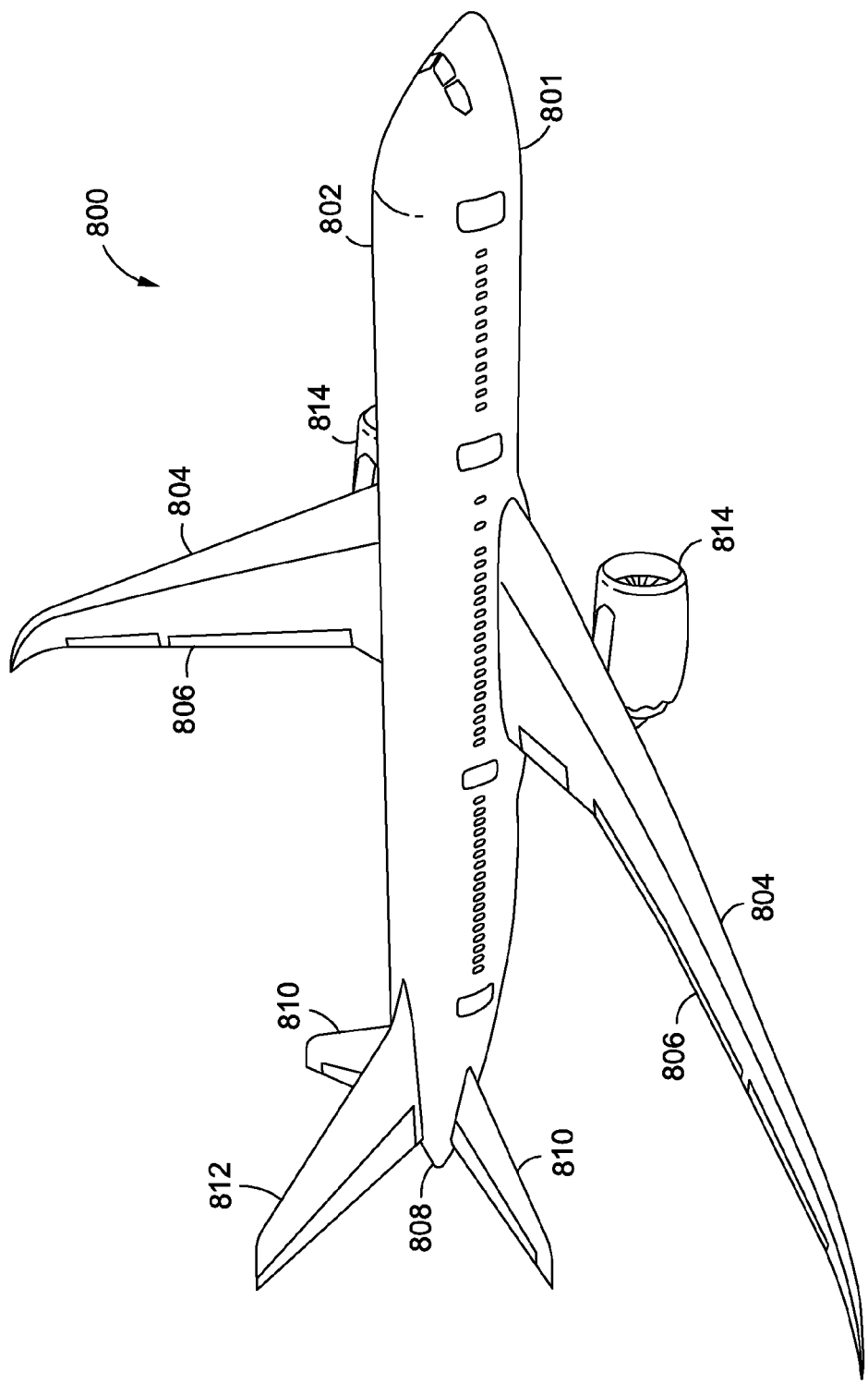
FIG. 17 is a perspective illustration of an aircraft which may incorporate the composite article in one or more embodiments.

Referring to FIG. 17, shown is a perspective illustration of an aircraft 800 which may incorporate one or more embodiments of the composite article 100 (FIG. 1) as disclosed herein. The aircraft 800 may include a fuselage 802 having a pair of wings 804 and a tail section 808 which may include a vertical stabilizer 812 and horizontal stabilizers 810. The aircraft 800 may further include control surfaces 806 and propulsion units 814. The aircraft 800 may be generally representative of one of a variety of vehicles that may incorporate one or more of the composite articles 100 as described herein.

In an embodiment, the composite article 100 (FIG. 1) may comprise a composite panel 104 (FIG. 1). In the non-loaded condition, loads on the composite panel 104 may be limited to static loads such as due to gravitational force acting on a mass of the composite panel 104 or other static loads acting on the aircraft 800 (FIG. 17). An example of a non-loaded condition may include the aircraft 800 fuselage 802 being un-pressurized such as when the aircraft 800 is parked on an airport tarmac.

Step 706 of the method 700 of FIG. 16 may include placing the composite article 100 (FIG. 1) in a loaded condition wherein the vehicle 801 (FIG. 17) may be in motion and/or the composite panel 104 may be subjected to a dynamic load. For example, the vehicle may comprise the aircraft 800 (FIG. 17) in motion on a runway during takeoff. The loaded condition may also comprise the aircraft 800 fuselage 802 being pressurized. In the loaded condition, loads on the composite article 100 may include any one of compression loads, tension loads, shear loads, torsion loads, or any combination thereof.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A macro fiber for a composite article, comprising:
a plurality of inner fibers each having an inner fiber final cross-sectional size of less than approximately 100 nanometers;
the inner fibers being surrounded by matrix material and being aligned with one another within the matrix material and having an inner fiber length approximately equivalent to a macro fiber length; and
wherein the matrix material surrounding the inner fibers is initially in a solid state prior to the formation of the composite article and the macro fiber is configured to be positioned adjacent to other macro fibers and the matrix material viscosity is reduced for intermingling with the matrix material of adjacent macros fibers prior to curing or solidifying the matrix material to form the composite article.

2. The macro fiber of claim 1, wherein:
the macro fiber has a cross-sectional shape comprising at least one of an upper surface and a lower surface; and
at least one of the upper and lower surfaces being substantially planar.

3. The macro fiber of claim 2, wherein:
the cross-sectional shape comprises a sheet having an aspect ratio of a macro fiber width to a macro fiber thickness of at least approximately 10.

4. The macro fiber of claim 1, wherein:
the matrix material has an optical property; and
the optical property of the matrix material being substantially equivalent to the optical property of at least one of the inner fibers.

5. The macro fiber of claim 4, wherein:
the optical property comprises a refractive index.

6. The macro fiber of claim 1, wherein:
the inner fibers are formed from a material comprising at least one of a thermoplastic material, a thermosetting material, an inorganic material, and a glass material.

7. The macro fiber of claim 6, wherein:
the inner fibers are formed of a thermoplastic material and are stretched.

8. The macro fiber of claim 1, wherein:
the matrix material comprises at least one of a thermoplastic material and a thermosetting material.

9. The macro fiber of claim 1, wherein:
the inner fibers and the matrix material are comprised of substantially optically transparent material.

10. The macro fiber of claim 1 wherein:
the macro fiber has a maximum macro fiber thickness in a range of from approximately 3 microns to 5000 microns.

11. A method of manufacturing a macro fiber, comprising the step of:
forming a plurality of inner fibers each having an inner fiber final cross-sectional size of less than approximately 100 nanometers;
surrounding the inner fibers with matrix material to form a macro fiber, the inner fibers being aligned with one another within the macro fiber and having an inner fiber length approximately equivalent to a macro fiber length;
forming the macro fiber in a predetermined cross-sectional shape; and
wherein the matrix material surrounding the inner fibers is initially in a solid state prior to the formation of the composite article and the macro fiber is configured to be positioned adjacent to other macro fibers and the matrix material viscosity is reduced for intermingling with the matrix material of adjacent macros fibers prior to curing or solidifying the matrix material to form a composite article.

12. The method of claim 11 further comprising the step of:
forming the inner fibers and the matrix material substantially simultaneously.

13. The method of claim 11 wherein the step of forming the macro fiber in the predetermined cross-sectional shape comprises:
forming the predetermined cross-sectional shape with at least one of an upper surface and a lower surface; and
at least one of the upper surface and the lower surface being substantially planar.

14. The method of claim 11 further comprising the steps of:
forming the macro fiber from matrix material having an optical property that is substantially equivalent to the optical property of at least one of the inner fibers.

15. The method of claim 11 further comprising the step of:
stretching the inner fibers.

16. A method of forming a composite article, comprising:
providing a plurality of macro fibers, each one of the macro fibers comprising a plurality of inner fibers surrounded by matrix material initially in a solid state prior to the formation of the composite article, each one of the inner fibers having an inner fiber final cross-sectional size of less than approximately 100 nanometers, the inner fibers within each macro fiber being aligned with one another and having an inner fiber length approximately equivalent to a macro fiber length;
reducing a viscosity of the matrix material to cause intermingling of the matrix material among the plurality of the macro fibers; and
performing at least one of curing and solidifying of the matrix material to form a composite article.

17. The method of claim 16, wherein the step of providing the plurality of macro fibers additionally comprises:
arranging the macro fibers in side-by-side arrangement to form a structural layer.

18. The method of claim 17, further comprising the step of:
arranging a plurality of the structural layers in a stacked formation.

19. The method of claim 18 wherein the macro fibers have a stretched direction, the method further comprising the step of:
orienting at least one of the structural layers such that the stretched direction of the macro fibers in one of the structural layers is oriented generally non-parallel to the stretched direction of the macro fibers in an adjacent one of the structural layers.

20. A method of using a composite article, comprising the steps of:
providing a composite article having a plurality of macro fibers, each one of the macro fibers comprising a plurality of inner fibers surrounded by matrix material, each one of the inner fibers having an inner fiber final cross-sectional size of less than approximately 100 nanometers, the inner fibers within each macro fiber being aligned with one another and having an inner fiber length approximately equivalent to a macro fiber length, wherein the matrix material surrounding the inner fibers is initially in a solid state prior to the formation of the composite article and the macro fiber is configured to be positioned adjacent to other macro fibers and the matrix material viscosity is reduced for intermingling with the matrix material of adjacent macros fibers prior to curing or solidifying the matrix material to form the composite article;
placing the composite article in a non-loaded condition; and
placing the composite article in a loaded condition.

21. The method of claim 20, wherein:
the non-loaded condition is associated with a vehicle being substantially non-moving; and
the loaded condition being associated with the vehicle in motion.

* * * * *